March 26, 1946.   S. ARGYRIS   2,397,115
ELECTRIC BICYCLE
Filed Jan. 25, 1945   2 Sheets-Sheet 2
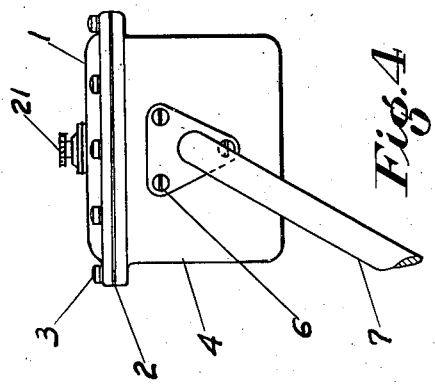
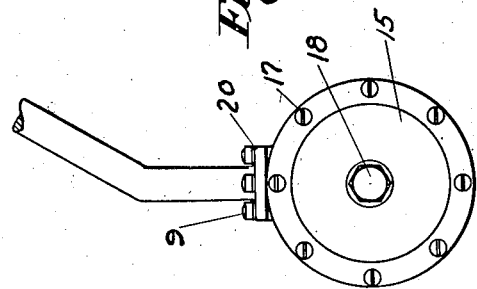
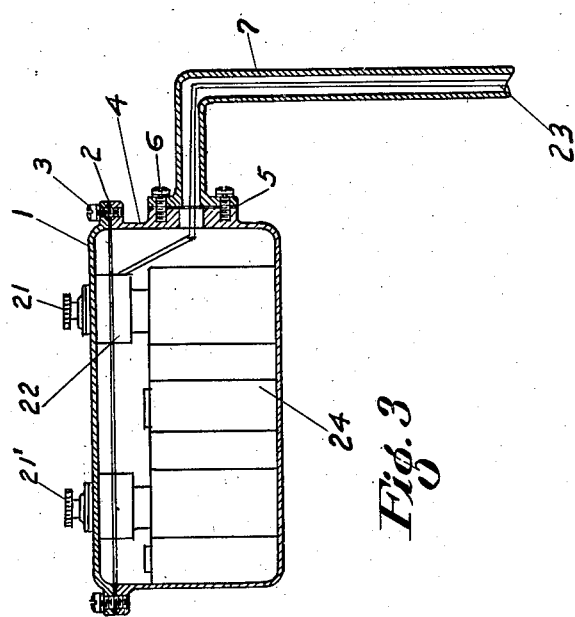
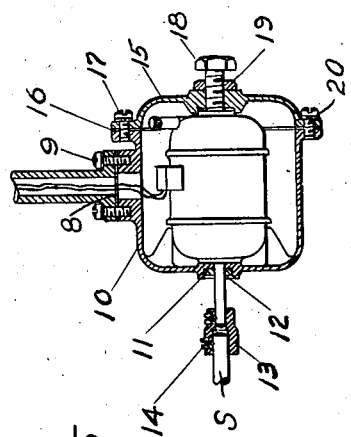
Inventor
Stefanos Argyris
By
Attorney Patented Mar. 26, 1946

2,397,115

UNITED STATES PATENT OFFICE 2,397,115

ELECTRIC BICYCLE

Stefanos Argyris, Detroit, Mich., assignor of two-fifths (forty per cent) to Gus Poulis, Washington, D. C.

Application January 25, 1945, Serial No. 574,488

4 Claims. (Cl. 180—34)

This invention relates to bicycles and has for its object the electrification of any ordinary bicycle with the least possible cost for materials, mechanical alterations, labor and continued operation.

Another object of this invention is to convert a foot-operated bicycle to an electrically operated one, and yet have it in much a condition as to be readily reconverted back to a foot-operated one, with very little labor and with no cost at all. This is especially advantageous if the battery should become exhausted while the vehicle is out on the road.

A further object of this invention is to produce a bicycle which may be readily operated by either foot or electrical power, at the will and pleasure of its user.

Other, and more specific, objects and advantages of this invention will be made clear from the following description when read in connection with the accompanying drawings which illustrate the important operative embodiments of the contemplated device.

Referring now to said drawings in which like numerals designate like or similar elements:

Fig. 3 is a cross-sectional view of the casing in which the batteries are housed.

Fig. 4 shows the exterior of the battery casing with a portion of the tube which encloses the connection from the battery to the motor.

Fig. 5 is a cross-sectional view of the motor-housing, showing the motor in its operative position.

Fig. 6 is a close-up, detailed, exterior end-view of the motor-housing when attached to the bicycle.

Figure 1:
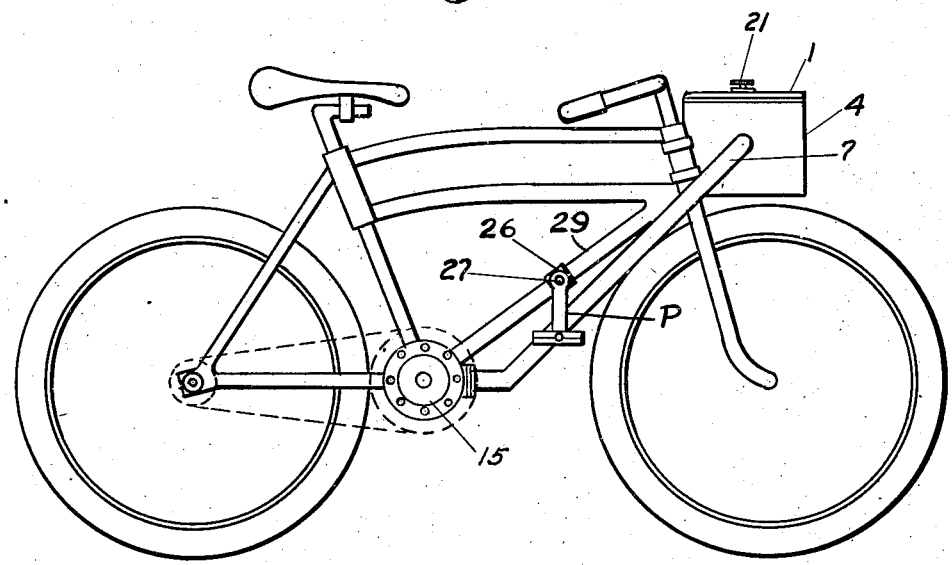
Fig. 1 represents an ordinarily bicycle after the same has been equipped with an electrical apparatus in accordance with the spirit of this invention.

Returning now for a more specific and detailed description of the device which the figures above set forth are intended to illustrate, the bicycle shown in Fig. 1 is made up of the well known type of frame, wheels, sprocket shaft, sprocket wheel and chain, saddle, handle-bars, pedals P, etc. commonly used in the make-up of the ordinary bicycle. The sprocket wheel shaft is of the type having demountable pedal cranks.

I take such an ordinary bicycle and fasten, by any convenient means, on the fore vertical or steering rod of its frame, just in front of and practically on the level with its handle-bars, a metal casing or "basket" 4 carrying either wet or dry batteries 24. This metal casing is provided with a lid 1 which is secured thereon by screws 3 passing through it and compressing a gasket 2 upon the casing 4.

Figure 2:
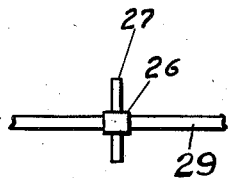
Fig. 2 represents means for supporting the pedals in their position when the bicycle is operated by electrical power.

I then remove the pedal cranks from their usual position on sprocket shaft S and transfer them to a new position on the pins 27 of collar 26 that is carried by frame piece 29 of the bicycle frame (see Figs. 1 and 2). When the pedal cranks are placed upon said pins the pedals may be used as foot rests during the time that the bicycle is electrically propelled and they are thus carried in a convenient position of accessibility if the battery should become exhausted and it should become necessary to manually propel the bicycle.

I then connect shaft 12 of an electric motor 18 to the sprocket wheel shaft S from which the pedals were removed. I accomplish this by providing a coupling collar 13, on shaft 12, which may be engaged with the sprocket wheel shaft by set screw 14 (see Fig. 5).

For the protection of the motor I provide an especially designed and made metallic shell or housing 10 which has an inner shaft-seal ring 11, and an outer cap 15 fastened thereto at gasket 16 by screws 17 held fast and in place by lock washers 20. The outer end of the motor is held up in the housing shell by means of a clamp screw 18 and lock nut 19.

The batteries 24 are connected to the motor 23 by wire 23 running through and encased by tube 7 which is connected to battery-casing 4 at gasket 5 by screw-bolts 6, and to the motor-housing 15 at gaskets 8 by screw-bolts 9.

The lid 1 of battery-casing 4 is provided with apertures through which turn-buttons 21 and 21¹ go through to operate ordinary electric switches (not shown) 21 being for turning on and off the electric current, and 21¹ being for turning on and off the electric light on the bicycle.

After this equipment is mounted on any ordinary bicycle, in the manner above set forth, the operator or rider can sit on the saddle, place his feet on the pedals (which are at this time placed upon supporting pins 27 projecting laterally from frame piece 29) hold the handle-bars with one hand, turn on the electric current with the other, balance himself and start off. The switch 21 is made to have different speeds, as slow, medium and fast, which can be readily controlled by the rider.

In case it becomes necessary or desirable to resume foot-power operation for the bicycle, the motor is removed and in its stead are replaced the pedals in their original position to be used as before the conversion was effected. It may be explained that the conventional bicycle has its sprocket wheel mounted upon a shaft, which shaft is journaled by ball bearings in the crank hanger which constitutes an integral part of the bicycle frame. The sprocket wheel shaft projects far enough beyond the ends of the crank hanger to receive the pedal cranks.

Under my invention the only change that is required to convert the bicycle from a foot propelled to an electrically propelled vehicle, is to remove the pedal cranks from the sprocket wheel shaft, place them upon the pins 21 (where they serve as foot rests) and connect the motor shaft 12 to the sprocket wheel shaft by coupling 13, as shown in Fig. 5.

Having thus described my invention I claim as my own any changes or variation which fall within the spirit, scope and purpose thereof. More specifically, however, I claim as my invention:

1. The combination with a bicycle comprising the usual frame and sprocket wheel shaft having demountable cranks and pedals, of an electric motor comprising a shaft and means for directly engaging an end of the said motor shaft with an end of the sprocket wheel shaft in place of one of the cranks and its pedal.

2. A structure as recited in claim 1, wherein the said engaging means comprises a coupling collar one end of which is engaged with the motor shaft and the other end of which is engaged with the sprocket wheel shaft.

3. A structure as recited in claim 1, in combination with supports for the removed cranks and pedals located upon the frame at such a point that when the pedals are mounted thereon they serve as foot rests.

4. The combination with a bicycle of the type having a frame and a driving sprocket wheel shaft separate from the pedal cranks of the bicycle, of an electric motor having an axial shaft, and a coupling replacing a pedal crank dimensioned to connect an end of the sprocket wheel shaft with an end of the motor shaft to establish an end to end, axial engagement therebetween, and supports for the pedal cranks carried by the bicycle frame and projecting laterally from opposite sides thereof and at a point to make the pedals serve as foot rests when their cranks are mounted upon said supports.

STEFANOS ARGYRIS.